United States Patent [19]

Van Gorp

[11] 4,407,719

[45] Oct. 4, 1983

[54] MAGNETIC WATER TREATMENT APPARATUS AND METHOD OF TREATING WATER

[76] Inventor: Donald J. Van Gorp, Rte. #2, Pella, Iowa 50219

[21] Appl. No.: 316,725

[22] Filed: Oct. 30, 1981

[51] Int. Cl.³ .............................................. C02F 1/48
[52] U.S. Cl. .................................. 210/695; 210/742; 210/96.1; 210/222
[58] Field of Search .............. 210/222, 223, 243, 695, 210/742, 96.1; 209/232, 214, 223 R

[56] References Cited

U.S. PATENT DOCUMENTS

| | | | |
|---|---|---|---|
| 2,652,925 | 9/1953 | Vermeiren | 210/222 |
| 4,288,323 | 9/1981 | Brigante | 210/222 |
| 4,326,954 | 4/1982 | Shroyer | 210/243 |

OTHER PUBLICATIONS

Welch, L. B., Prior Art Device depicted in a drawing filed in applicant's Prior Art Statement filed Mar. 25, 1982, (Paper #2).

*Primary Examiner*—Benoit Castel
*Attorney, Agent, or Firm*—Zarley, McKee, Thomte, Voorhees & Sease

[57] ABSTRACT

A water treatment apparatus includes a section of pipe arranged at the center of an electromagnetic force field created by a solenoid coil or the like positioned about the periphery of the pipe. A metal stationary rod is supported within the pipe and electrically insulated from the pipe such that water directed through the pipe passes by the rod. The rod is supported at both ends by insulated bearings secured within the pipe.

5 Claims, 3 Drawing Figures

MAGNETIC WATER TREATMENT APPARATUS AND METHOD OF TREATING WATER

BACKGROUND OF THE INVENTION

This invention is directed generally to water treatment apparatus and more particularly to an improved apparatus in which water is magnetically treated as it is passed through a magnetic force field.

It has long been known that the magnetic treatment of water may be advantageous for various purposes. For example, the Faunce and Cabell U.S. Pat. No. 438,579 shows a device for the magnetic treatment of boiler feed water for the purpose of removing and preventing the formation of scale in the boiler. The recent Rigby U.S. Pat. No. 4,065,386 teaches magnetic treatment of water for the purpose of controlling or eliminating algae and bacterial growth. Presently known devices for the magnetic treatment of water sometimes employ an impeller secured within an electric field and within a water flow path. Portions of the treated water are recirculated through the electric field. Although such devices have successfully provided for the magnetic treatment of water, these devices have not been completely trouble-free and they are expensive to construct.

Accordingly, it is a primary object of the present invention to provide an improved magnetic water treatment apparatus and method for treating water.

A further object of the invention is to provide a magnetic water treatment apparatus with no moving parts and which does not require some recirculation of treated water through the apparatus.

Finally, it is an object of the invention to provide a magnetic water treatment unit which is economical to manufacture, simple in construction and efficient in operation.

SUMMARY OF THE INVENTION

The magnetic water treatment apparatus of the present invention includes an elongated pipe having a metallic rod stationarily supported therein and electrically insulated from the pipe. An electrical solenoid coil surrounds the rod externally of the pipe to establish an electro-magnetic force field within and through the pipe. Water directed through the pipe moves past the rod within the magnetic field. As a result, the ultra sound waves that form a part of the magnetic field have a detrimental effect on the bacteria and impurities in the water.

DESCRIPTION OF THE PREFERRED EMBODIMENT

Figure 1:
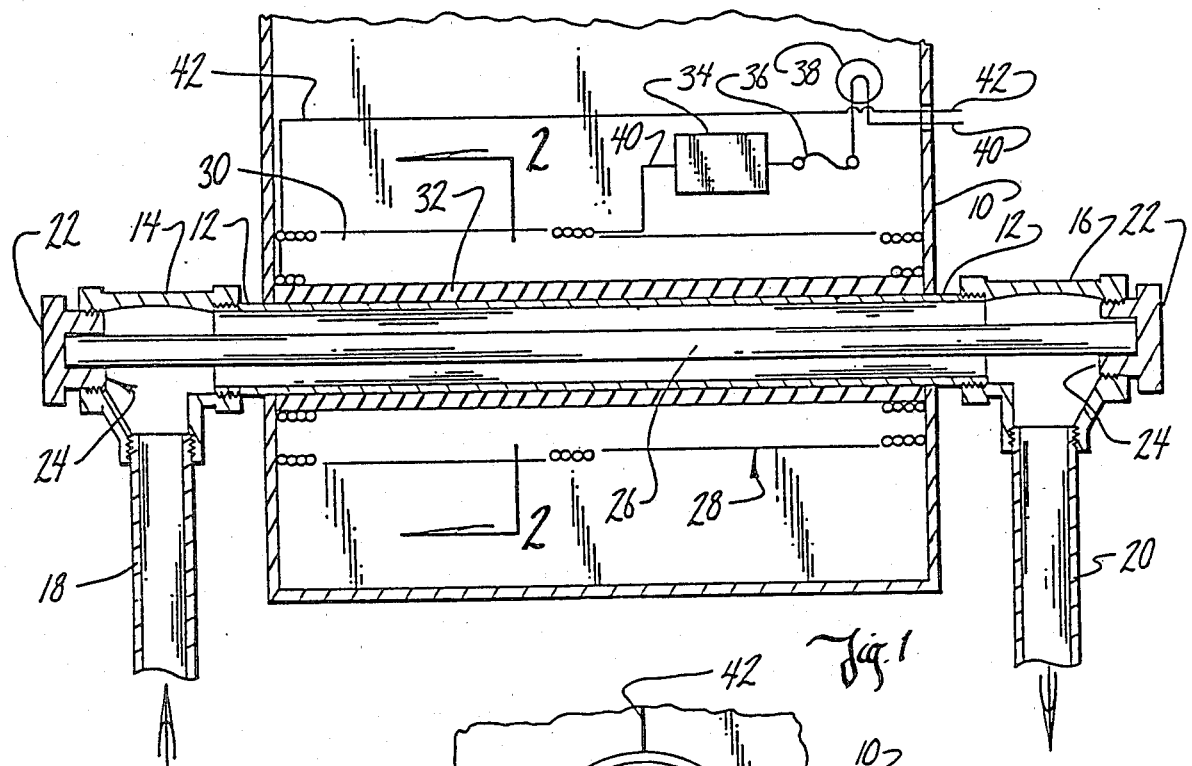
FIG. 1 is a longitudinal sectional view of the magnetic water treatment apparatus of the invention including an electrical schematic diagram of the circuitry thereof, as seen on line 1—1 of FIG. 2.
Figure 2:
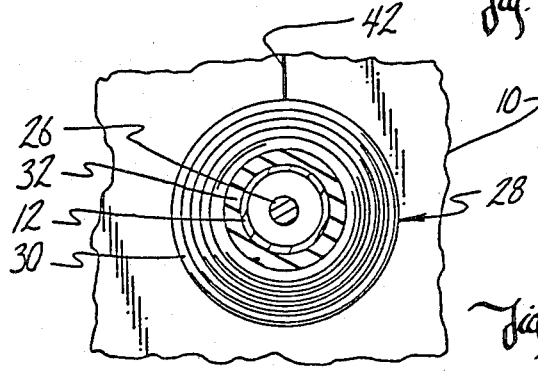
FIG. 2 is a transverse sectional view of the apparatus as taken on line 2—2 of FIG. 1.
Figure 3:
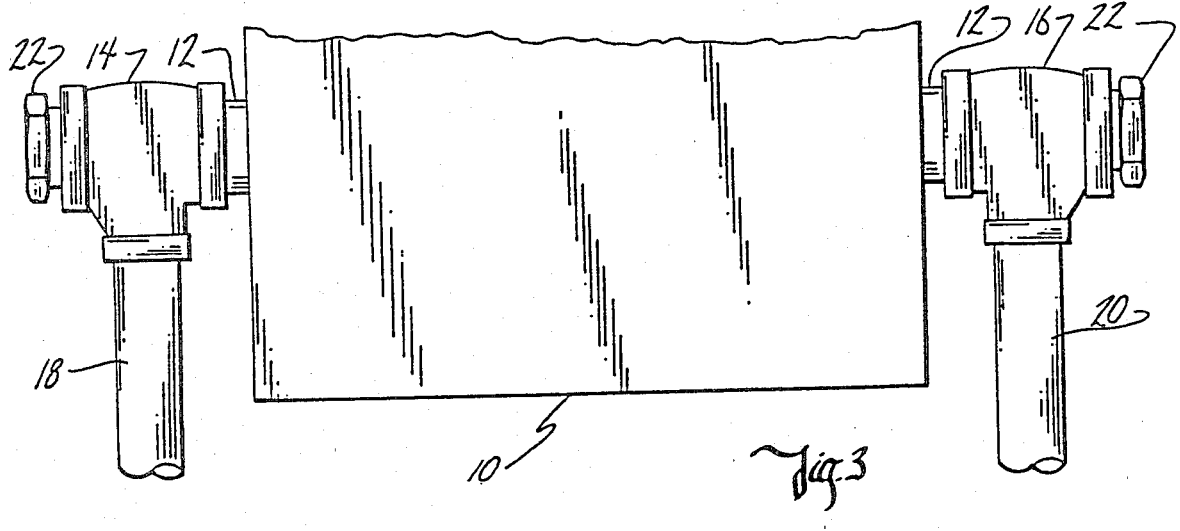
FIG. 3 is a partial plan view of the apparatus of the invention.

The numeral 10 designates a container box for the device of this invention through which an elongated metal pipe 12 extends. T-connections 14 and 16 are threadably secured to opposite ends of pipe 12 at the exterior ends of the pipe. An inlet pipe 18 is threadably secured to T-connection 14, and an outlet pipe 20 is threadably secured to T-connection 16.

Plastic plugs 22 are threadably inserted in the ends of T-connections 14 and 16. Apertures 24 appear in each of the plastic plugs 22 and are located on the longitudinal axis of the pipe 12. A nickel rod 26 extends completely through pipe 12 and has its ends mounted in the apertures 24 of plastic plugs 22.

The outside diameter of pipe 12 is in the order of 1", and the outside diameter of rod 26 is in the order of 5/16", whereby there is substantial space between the inside diameter of pipe 12 and the outside diameter of rod 26. The material of pipe 12, T-connections 14 and 16 and inlet and outlet pipes 18 and 20 are stainless steel 304, schedule 40.

An electric coil 28 is comprised of wire 30 wound on insulating sleeve 32. The wire 30 is preferably #18 wire and is magnetic coated wire.

The outer coil of wire 30 is connected to a source of alternating current through a "hot line" 40 into which is imposed thermostat 34, fuse 36, and bulb 38.

A ground line 42 extends from the initial convolution of coil 28. Both lines 40 and 42 extend through a suitable aperture in box 10 for connection through conventional means to a source of 110 volt AC energy.

The thermostat 34 is of conventional design and should have the capability of breaking the circuit through lines 40 whenever the temperature of the coil is 130° F. The thermostat 34 has the capability of again closing the circuit of lines 40 whenever the temperature is 96° F. or below. A three minute delay mechanism is normally imposed in thermostat 34 to give the coil an opportunity to cool in the event that the circuit is broken at the upper temperature limit of the thermostat.

In operation, a source of water to be treated is imposed in pipe 12 through inlet pipe 18 when the coil 28 is energized. The water to be purified passes through the pipe and outwardly through the outlet pipe 20. The inlet pipe 18 and the outlet pipe 20 are completely separated so that water leaving the apparatus through pipe 20 will never re-enter pipe 12.

Upon intermittent flow of water through the apparatus, the coil 28 will become quite warm if water is not flowing through the apparatus. Thermostat 34 will break the source of energy through the coil at approximately 130° F. so that the coil will not become burned out. Ordinarily, water flowing through the apparatus will keep the coil 28 at a temperature less than 96° F., whereupon thermostat 34 will open.

The coil 28 is insulated from the housing by the coating thereon and insulated from pipe 12 by the insulation sleeve 32.

The alternating current flowing through the coil sets up an electrical field. The presence of the nickel pipe 26 in the electrical field creates a magnetic field which has a detrimental effect on bacteria and impurities in water flowing through the apparatus. The device of this invention has been tested and very satisfactory results have been obtained through the method and apparatus of this invention.

The bulb 38 is illuminated and when the coil is energized, the bulb 38 is normally visible from the exterior of the box 10 so that the operator will know that energy is supplied to the coil.

From the foregoing, it is seen that the device of this invention will achieve at least its stated objectives.

What is claimed is:

1. A water treatment apparatus comprising, elongated pipe means having an inlet and an outlet opening at the opposite ends thereof for the passage of water therethrough, means for establishing an alternating electro-magnetic force field within said pipe means, said means for establishing the electro-magnetic force field comprising an electrical coil, a thermostat connected to said coil, with said thermostat being connected to a source of alternating current, rod means comprised of ferromagnetic material supported within said pipe means whereby water passing through said pipe means surrounds said rod means, insulating means for magnetically insulating said means for establishing an alternating electro-magnetic force field from said pipe means, and insulating means for magnetically insulating said rod from said pipe, said inlet and outlet being completely separated so that water passing through said pipe means will not re-enter said pipe means.

2. The device of claim 1 wherein said rod means is nickel.

3. The device of claim 1 wherein said thermostat has means for closing the supply of current to said coil at approximately 96° F. and means for opening the supply of current to said coil at approximately 130° F.

4. The method of treating liquids, comprising passing fluid to be treated in one direction into, through and out of a pipe means, creating an alternating electro-magnetic force field within said pipe by utilizing a source of alternating current, passing said fluid through said pipe and within said electro-magnetic force field around ferromagnetic rod means, insulating said source of alternating current from said pipe means, insulating said rod means from said pipe means, and conveying all of said water leaving said pipe means away from said pipe means so that water leaving said pipe means will not re-enter said pipe means.

5. The device of claim 4 wherein rod means is nickel.

* * * * *